(12) United States Patent
Cho et al.

(10) Patent No.: US 12,469,257 B2
(45) Date of Patent: Nov. 11, 2025

(54) LIGHTWEIGHT IMAGE PROCESSING METHOD AND APPARATUS

(71) Applicant: GenGenAI, Inc., Seongnam-Si (KR)

(72) Inventors: Hojin Cho, Seongnam-si (KR); Sangil Kim, Yongin-si (KR)

(73) Assignee: GENGENAI, INC, Seoul (KR)

( * ) Notice: Subject to any disclaimer, the term of this patent is extended or adjusted under 35 U.S.C. 154(b) by 451 days.

(21) Appl. No.: 18/098,349

(22) Filed: Jan. 18, 2023

(65) Prior Publication Data

US 2024/0104899 A1    Mar. 28, 2024

(30) Foreign Application Priority Data

Sep. 28, 2022    (KR) .................. 10-2022-0123623

(51) Int. Cl.
*G06V 10/77* (2022.01)
*G06V 10/82* (2022.01)
*G06V 10/96* (2022.01)

(52) U.S. Cl.
CPC .......... *G06V 10/7715* (2022.01); *G06V 10/82* (2022.01); *G06V 10/96* (2022.01)

(58) Field of Classification Search
CPC ..... G06V 10/7715; G06V 10/96; G06V 10/82
See application file for complete search history.

(56) References Cited

U.S. PATENT DOCUMENTS

| | | | |
|---|---|---|---|
| 2021/0117687 A1 | 4/2021 | Ren et al. | |
| 2021/0118112 A1 | 4/2021 | Huang et al. | |
| 2021/0227152 A1 | 7/2021 | Zhang et al. | |
| 2021/0271927 A1* | 9/2021 | Suh | G06F 18/214 |
| 2022/0415027 A1* | 12/2022 | Nie | G06V 20/54 |
| 2023/0162522 A1* | 5/2023 | Zhang | G06V 10/454 |
| | | | 382/115 |
| 2024/0013573 A1* | 1/2024 | Liu | G06V 40/171 |
| 2024/0412480 A1* | 12/2024 | Wu | G06V 10/454 |
| 2024/0419187 A1* | 12/2024 | Sun | G06N 3/0464 |

FOREIGN PATENT DOCUMENTS

| | | |
|---|---|---|
| KR | 10-2018-0080081 A | 7/2018 |
| KR | 10-2021-0041039 A | 4/2021 |
| KR | 10-2021-0049717 A | 5/2021 |

(Continued)

OTHER PUBLICATIONS

Gao, Cui, et al., "YOLOv4 Object Detection Algorithm with Efficient Channel Attention Mechanism," 2020 5th International Conference on Mechanical, Control and Computer Engineering (ICMCCE), downloaded on May 26, 2021, 7 pages.

(Continued)

*Primary Examiner* — Utpal D Shah
(74) *Attorney, Agent, or Firm* — Banner & Witcoff, Ltd.

(57) ABSTRACT

A lightweight image processing method is provided. The method may be performed by one or more processors, and include extracting a feature map from an image, calculating a channel attention vector based on the feature map, generating a weighted feature map based on the feature map and based on the channel attention vector, inputting the weighted feature map to an image processing model to generate a processed image. The image processing model may include an artificial neural network model.

20 Claims, 8 Drawing Sheets

(56) References Cited

FOREIGN PATENT DOCUMENTS

KR    10-2021-0094451 A    7/2021

OTHER PUBLICATIONS

Luo, Haifeng, et al., "High-Resolution Aerial Images Semantic Segmentation Using Deep Fully Convolutional Network With Channel Attention Mechanism," IEEE Journal of Selected Topics in Applied Earth Observations and Remote Sensing, vol. 12, No. 9, Sep. 2019, downloaded on Nov. 11, 2022, 16 pages.

Ding, Pak Lun Kevin, et al., "Deep Residual Dense U-Net for Resolution Enhancement in Accelerated MRI Acquisition," Jan. 13, 2020, 8 pages.

Yang "An Overview of the Attention Mechanisms in Computer Vision", Journal of Physics: Conference Series, [Online] vol. 1693, No. 1, Dec. 1, 2020 (Dec. 1, 2020), XP093125437, GB ISSN: 1742-6588, DOI: 10.1088/1742-6596/1693/1/012173.

Woo et al. "CBAM: Convolutional Block Attention Module", SAT 2015 18TH International Conference, Austin, TX, USA, Sep. 24-27, 2015; [Lecture Notes in Computer Science; Lect.Notes Computer], Springer, Berlin, Heidelberg, vol. 11211 Chap.1, No. 558, Oct. 6, 2018 (Oct. 6, 2018), pp. 3-19, XP047488240, ISBN: 978-3-540-74549-5.

Hu et al. "Squeeze-and-Excitation Networks" 2018 IEEE/CVF Conference on Computer Vision and Pattern Recognition, IEEE, Jun. 18, 2018 (Jun. 18, 2018), pp. 7132-7141, XP033473632, DOI: 10.1109/CVPR.2018.00745.

\* cited by examiner

LIGHTWEIGHT IMAGE PROCESSING METHOD AND APPARATUS

CROSS-REFERENCE TO RELATED APPLICATION

This application claims priority under 35 U.S.C § 119 to Korean Patent Application No. 10-2022-0123623, filed in the Korean Intellectual Property Office on Sep. 28, 2022, the entire contents of which are hereby incorporated by reference.

BACKGROUND

Technical Field

The present disclosure relates to a lightweight image processing method and an apparatus, and more specifically, to a method and an apparatus for processing an image at high speed using small computing resources.

Discussion of the Background

Studies on image processing technologies, such as recognizing an object from an image, increasing the resolution of an image, and the like are actively conducted. In the field of object recognition technology, it is important to accurately recognize a target object in an image, and in the field of image resolution enhancement technology, it is important to improve the quality of an input image to higher fidelity. In order to increase the accuracy of object recognition or to acquire a high-resolution image, technique such as the convolution neural network (CNN) and the like may be used.

Meanwhile, in order to process images by focusing on a specific region, the attention module may be used in the machine learning model. If the attention module is used, a weighted feature map may be generated, and the image may be processed based on the weighted feature map. If the weighted feature map is used, further enhanced performance in the image processing can be obtained.

However, until such a weighted feature map is generated, a long computation time as well as significant computing resources may be required. Because of the long computation time and significant computing resources required for generating the weighted feature map, image processing is mainly performed in a device (e.g., a server) having a large amount of computing resources. If image processing is performed in a device (e.g., a mobile terminal) having few computing resources, the image may be processed after a long time or an unwanted problem may occur in the device due to overload during image processing. Accordingly, there is a demand for a technology capable of stable and high-speed image processing even in a device having a small amount of computing resources.

SUMMARY

In order to solve one or more problems (e.g., the problems described above and/or other problems not explicitly described herein), the present disclosure provides a method, a computer program stored in a recording medium, and an apparatus (system) for processing an image.

The present disclosure may be implemented in a variety of ways, including a method, an apparatus (system), and/or a non-transitory computer-readable storage medium recording instructions.

A method for processing a lightweight image is provided, which may be performed by one or more processors of one or more computing devices. The method may include extracting a feature map from an image, calculating a channel attention vector based on the feature map, generating a weighted feature map based on the feature map and based on the channel attention vector, and inputting the weighted feature map to an image processing model to generate a processed image and generating the processed image. The image processing model may be an artificial neural network model.

The feature map may have a plurality of channels, and the calculating the channel attention vector may include acquiring a plurality of sampled channels of the feature map by performing sampling on each of the plurality of channels of the feature map, and calculating the channel attention vector based on the plurality of sampled channels of the feature map.

The sampling performed on each of the plurality of channels of the feature map may be a regular sampling based on a predetermined interval.

The sampling performed on each of the plurality of channels of the feature map may be an irregular sampling.

The sampling performed on each of the plurality of channels of the feature map may be performed according to a Gaussian distribution.

The acquiring the plurality of sampled channels may include acquiring a sampling pattern, and performing sampling on each of the plurality of channels of the feature map using the acquired sampling pattern.

The acquiring the sampling pattern may include identifying a type of the image, and acquiring, from a plurality of pre-stored sampling patterns, the sampling pattern as a sampling pattern associated with the identified type of the image.

The calculating the channel attention vector may include performing an average pooling or a maximum pooling on each of the plurality of sampled channels of the feature map.

The acquiring the plurality of sampled channels may include acquiring an amount of available computing resources, determining a sampling level based on the acquired amount of available computing resources, and performing sampling on each of the plurality of channels of the feature map based on the determined sampling level.

There may be provided a non-transitory computer-readable recording medium storing instructions that, when executed, cause performance of the method for processing the features described above.

An apparatus may be provided, which may include a memory; and one or more processors connected to the memory and configured to execute one or more computer-readable programs included in the memory, in which the one or more programs may include instructions. The instructions may, when executed by the one or more processors, cause the apparatus to extract a feature map from an image, calculate a channel attention vector based on the feature map, generate a weighted feature map based on the feature map and based on the channel attention vector, and input the weighted feature map to an image processing model to generate a processed image, and generating the processed image, and the image processing model may be an artificial neural network model.

According to some examples of the present disclosure, since the pooling operation is performed based on the features sampled from the feature map, not only the speed of the pooling operation is improved, but also computing resources required for the pooling operation can be reduced.

Accordingly, images can be processed stably and at high speed even in a device having a small amount of computing resources.

According to some examples of the present disclosure, the sampling interval for a region of interest is narrowed, and based on the sampling intervals, a greater number of samples can be obtained from the region of interest than the other regions. Accordingly, the region of interest can be more intensively analyzed, and accuracy of image processing may be improved.

According to some examples of the present disclosure, among a plurality of sampling patterns different from each other, a sampling pattern can be determined based on the image type, and the sampling of the feature map can be performed using the determined sampling pattern. Accordingly, the sampling is performed adaptively according to the image type, so that various images can be stably processed.

According to some examples of the present disclosure, the sampling interval (or level) can be adaptively adjusted based on the available computing resources. Accordingly, the sampling interval can be determined at close intervals if there are many available computing resources, and the sampling interval can be determined at wider intervals if there are few available computing resources.

The effects of the present disclosure are not limited to the effects described above, and other effects not described herein can be clearly understood by those of ordinary skill in the art (referred to as "ordinary technician") from the description of the claims.

BRIEF DESCRIPTION OF THE DRAWINGS

The above and other objects, features and advantages of the present disclosure will become more apparent to those of ordinary skill in the art by describing in detail exemplary examples thereof with reference to the accompanying drawings, in which.

DETAILED DESCRIPTION

Hereinafter, example details for the practice of the present disclosure will be described in detail with reference to the accompanying drawings. However, in the following description, detailed descriptions of well-known functions or configurations will be omitted if it may make the subject matter of the present disclosure rather unclear.

In the accompanying drawings, the same or corresponding components are assigned the same reference numerals. In addition, in the following description of various examples, duplicate descriptions of the same or corresponding components may be omitted. However, even if descriptions of components are omitted, it is not intended that such components are not included in any example.

Advantages and features of the disclosed examples and methods of accomplishing the same will be apparent by referring to examples described below in connection with the accompanying drawings. However, the present disclosure is not limited to the examples disclosed below, and may be implemented in various forms different from each other, and the examples are merely provided to make the present disclosure complete, and to fully disclose the scope of the disclosure to those skilled in the art to which the present disclosure pertains.

The terms used herein will be briefly described prior to describing the disclosed example(s) in detail. The terms used herein have been selected as general terms which are widely used at present in consideration of the functions of the present disclosure, and this may be altered according to the intent of an operator skilled in the art, related practice, or introduction of new technology. In addition, in specific cases, certain terms may be arbitrarily selected by the applicant, and the meaning of the terms will be described in detail in a corresponding description of the example(s). Therefore, the terms used in the present disclosure should be defined based on the meaning of the terms and the overall content of the present disclosure rather than a simple name of each of the terms.

As used herein, the singular forms "a," "an," and "the" are intended to include the plural forms as well, unless the context clearly indicates the singular forms. Further, the plural forms are intended to include the singular forms as well, unless the context clearly indicates the plural forms. Further, throughout the description, if a portion is stated as "comprising (including)" a component, it intends to mean that the portion may additionally comprise (or include or have) another component, rather than excluding the same, unless specified to the contrary.

Further, the term "module" or "unit" used herein refers to a software or hardware component, and "module" or "unit" performs certain roles. However, the meaning of the "module" or "unit" is not limited to software or hardware. The "module" or "unit" may be configured to be in an addressable storage medium or configured to play one or more processors. Accordingly, as an example, the "module" or "unit" may include components such as software components, object-oriented software components, class components, and task components, and at least one of processes, functions, attributes, procedures, subroutines, program code segments, drivers, firmware, micro-codes, circuits, data, database, data structures, tables, arrays, and variables. Furthermore, functions provided in the components and the "modules" or "units" may be combined into a smaller number of components and "modules" or "units", or further divided into additional components and "modules" or "units."

The "module" or "unit" may be implemented as a processor and a memory. The "processor" should be interpreted broadly to encompass a general-purpose processor, a central processing unit (CPU), a microprocessor, a digital signal processor (DSP), a controller, a microcontroller, a state machine, and so forth. Under some circumstances, the "processor" may refer to an application-specific integrated circuit (ASIC), a programmable logic device (PLD), a field-programmable gate array (FPGA), and so on. The "processor" may refer to a combination for processing devices, e.g., a combination of a DSP and a microprocessor, a combination of a plurality of microprocessors, a combination of one or more microprocessors in conjunction with a DSP core, or any other combination of such configurations. In addition, the "memory" should be interpreted broadly to encompass any electronic component that is capable of storing electronic information. The "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EE-PROM), flash memory, magnetic or optical data storage, registers, and so on. The memory is said to be in electronic communication with a processor if the processor can read information from and/or write information to the memory. The memory integrated with the processor is in electronic communication with the processor.

In the present disclosure, a "system" may refer to at least one of a server device and a cloud device, but not limited thereto. For example, the system may include one or more server devices. In another example, the system may include one or more cloud devices. In still another example, the system may include both the server device and the cloud device operated in conjunction with each other.

In addition, terms such as first, second, A, B, (a), (b), and the like are only used to distinguish a component from other components, and the essence, order, sequence, and the like of the component is not limited by the term.

In addition, in the following examples, if a certain component is stated as being "connected", "combined" or "coupled" to another component, it is to be understood that there may be yet another intervening component "connected", "combined" or "coupled" between the two components, although the two components may also be directly connected or coupled to each other.

In addition, as used in the following examples, "comprise" and/or "comprising" does not foreclose the presence or addition of one or more other elements, steps, operations, and/or devices in addition to the recited elements, steps, operations, or devices.

Hereinafter, various examples of the present disclosure will be described in detail with reference to the accompanying drawings.

Figure 1:
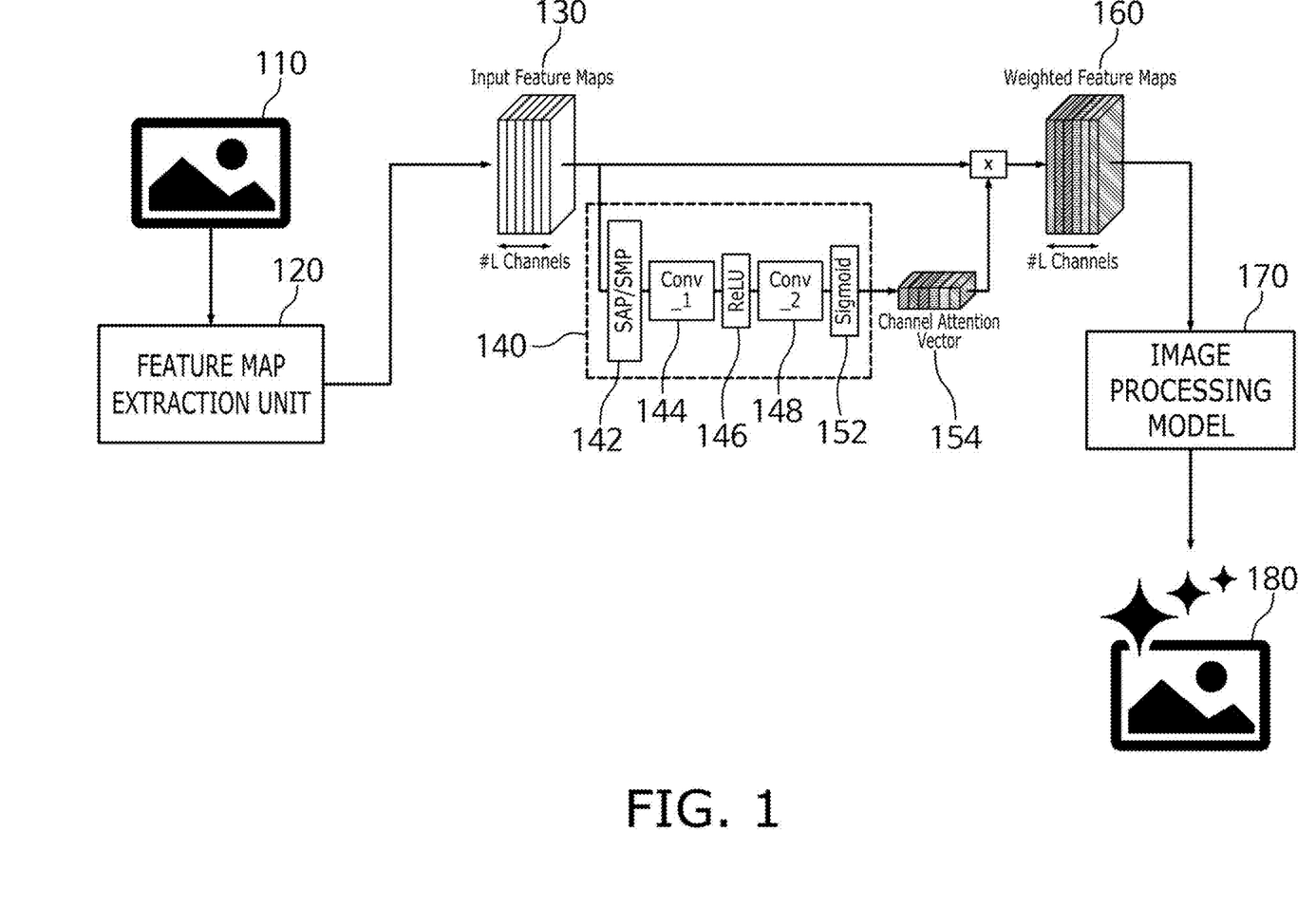
FIG. 1 is a diagram illustrating a process of inputting and processing an image.

FIG. 1 is a diagram illustrating a process of inputting and processing an image 110. At least one of a feature map extraction unit 120, an attention processing unit 140, and an image processing model 170 illustrated in FIG. 1 may be included in a user terminal to be described below. Additionally or alternatively, the feature map extraction unit 120, the attention processing unit 140, and the image processing model 170 may be included in an information processing system to be described below or a separate device.

The image 110 may be input to the feature map extraction unit 120, and the feature map extraction unit 120 may extract an image feature map 130 from the image. The feature map extraction unit 120 may extract the image feature map 130 having a plurality of channels using at least one filter or artificial neural network model. FIG. 1 illustrates that the image feature map 130 including L channels is extracted from the image 110.

The attention processing unit 140 may calculate a channel attention vector 154 based on each channel included in the image feature map 130. In this case, the channel attention vector 154 may include values for each channel. That is, if there are L number of channels in the image feature map 130, the channel attention vector 154 may include L number of values. The values for each channel may be different or the same as each other. A channel with a higher value may have a higher weight.

The attention processing unit 140 may include a plurality of layers 142 to 152 to calculate the channel attention vector 154. In addition, the attention processing unit 140 may be configured using a Convolution Neural Network (CNN). The attention processing unit 140 may include a sampled pooling layer 142, a first convolution layer 144, a rectified linear unit (ReLu) layer 146, a second convolution layer 148, and a sigmoid layer 152.

Rather than performing pooling on the entire region included in each channel, the sampled pooling layer 142 may sample some features included in each channel and perform pooling on the sampled features. The "feature" as used herein may represent a value of one region of the entire region of the channel. The sampled pooling layer 142 may perform average pooling or max pooling on the sampled features. According to the average pooling or max pooling performed on the sampled features, the corresponding layer 142 may be referred to as a sampled average pooling (SAP) layer or a sampled maximum pooling (SMP) layer.

A sample region and/or sampling interval may be determined to perform the sampling. Various examples of determining the sample region and/or the sampling interval will be described below with reference to FIGS. 4 to 7.

The sampled pooling layer 142 may sample a plurality of features from each channel included in the image feature map 130 based on the determined sampling region and/or sampling interval, and perform pooling for each channel based on the sampled features. The result of pooling for each channel may be sequentially passed through the first convolution layer 144, the ReLU layer 146, the second convolution layer 148, and the sigmoid layer 152, and the channel attention vector 154 may be calculated. In this example, the ReLu layer 146 may be a layer using an activation function.

For example, the result of pooling, i.e., the features may be input to the first convolution layer 144, and the result values calculated through the first convolution layer 144 may be input to the ReLu layer 146. The ReLu layer 146 may pass the feature as it is if the feature input from the first convolution layer 144 exceeds a threshold value, and may convert the feature into a preset value if the input feature is equal to or less than the threshold value. The value passed or converted through the ReLu layer 146 may be input to the second convolution layer 148, and the result value calculated by the second convolution layer 148 may be input to the sigmoid layer 152. A sigmoid function may be called based on the feature input to the sigmoid layer 152, and a scalar value (that is, weight) for each channel may be acquired based on an output value of the sigmoid function. The channel attention vector 154 may be configured by summing the scalar values (that is, weights) for each channel. The total sum of scalar values of each channel may be a specific value (e.g., 1). If a specific channel is assigned a higher weight, the corresponding channel may be a channel to be analyzed intensively.

The internal configuration of the attention processing unit 140 illustrated in FIG. 1 is merely an example, and configurations except the sampled pooling layer 142 may be added, deleted, or replaced as needed.

A weighted feature map 160 may be generated by combining the channel attention vector 154 and the image feature map 130. The weighted feature map 160 may be input to the image processing model 170, and the image processing model 170 may output a processed image 180. In this case, the image processing model 170 may be an artificial neural network model trained for image processing. For example, the image processing model 170 may be a super resolution model for improving the resolution of an image, and the processed image 180 may be an image with improved resolution and sharpness compared to the image 110. As another example, the image processing model 170 may be a model for recognizing a target object in an image. In addition, the image processing model 170 may be any model for processing images. For example, the image processing model 170 may be an image segmentation model or an image classification model.

Figure 2:
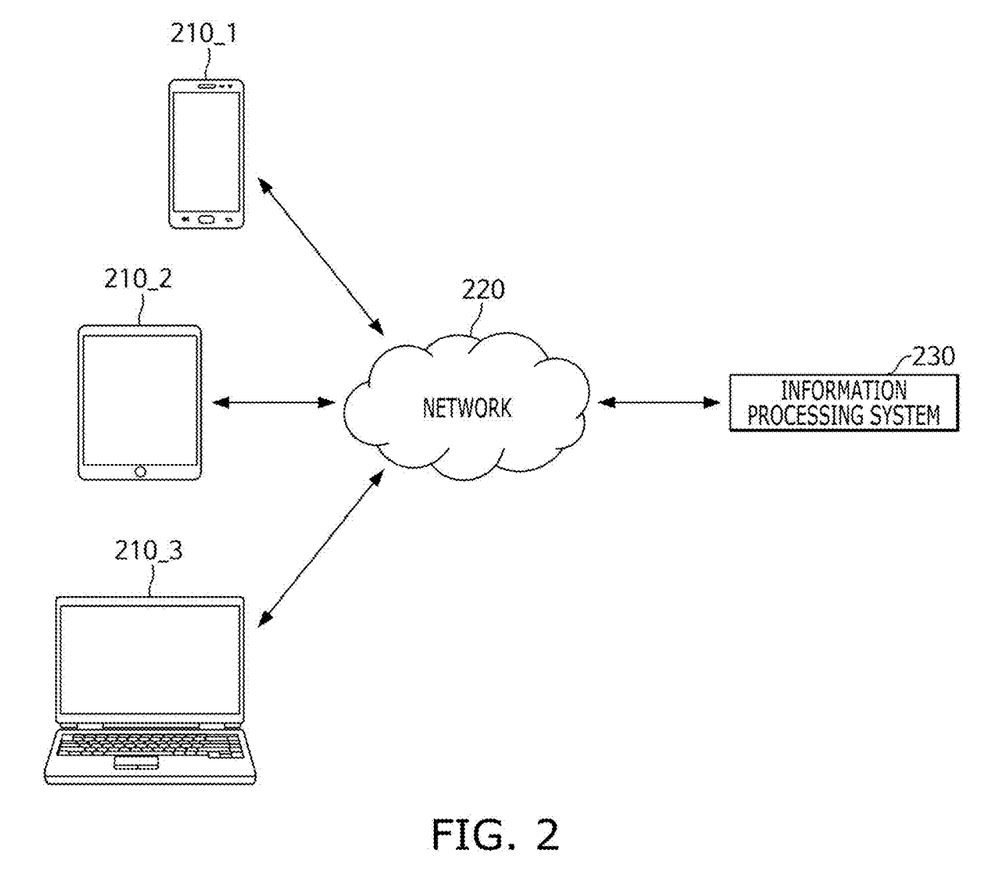
FIG. 2 schematically illustrates a configuration in which an information processing system is communicatively connected to a plurality of user terminals.

FIG. 2 schematically illustrates a configuration in which an information processing system 230 is communicatively connected to a plurality of user terminals 210_1, 210_2, and 210_3. As illustrated, the plurality of user terminals 210_1, 210_2, and 210_3 may be connected to the information processing system 230 through a network 220.

The information processing system 230 may include one or more server devices and/or databases, or one or more distributed computing devices and/or distributed databases based on cloud computing services that can perform image processing.

When receiving an image from the user terminals 210_1, 210_2, and 210_3, the information processing system 230 may process the image and transmit the processed image to the user terminals 210_1, 210_2, and 210_3. To this end, the information processing system 230 may include the feature map extraction unit 120, the attention processing unit 140, and the image processing model 170 as illustrated in FIG. 1.

The plurality of user terminals 210_1, 210_2, and 210_3 may communicate with the information processing system 230 through the network 220. The user terminals 210_1, 210_2, and 210_3 may transmit the image to the information processing system 230 and receive the image processed by the information processing system 230.

The network 220 may be configured to enable communication between the plurality of user terminals 210_1, 210_2, and 210_3 and the information processing system 230. The network 220 may be configured as a wired network such as Ethernet, a wired home network (Power Line Communication), a telephone line communication device and RS-serial communication, a wireless network such as a mobile communication network, a wireless LAN (WLAN), Wi-Fi, Bluetooth, and ZigBee, or a combination thereof, depending on the installation environment. The method of communication may include a communication method using a communication network (e.g., mobile communication network, wired Internet, wireless Internet, broadcasting network, satellite network, and the like) that may be included in the network 220 as well as short-range wireless communication between the user terminals 210_1, 210_2, and 210_3, but aspects are not limited thereto.

In FIG. 2, a mobile phone terminal 210_1, a tablet terminal 210_2, and a PC terminal 210_3 are illustrated as the examples of the user terminals, but aspects are not limited thereto, and the user terminals 210_1, 210_2, and 210_3 may be any computing device that is capable of wired and/or wireless communication. For example, the user terminal may include an AI speaker, a smart phone, a mobile phone, a navigation, a computer, a notebook, a digital broadcasting terminal, a personal digital assistant (PDA), a portable multimedia player (PMP), a tablet PC, a game console, a wearable device, an internet of things (IoT) device, a virtual reality (VR) device, an augmented reality (AR) device, a set-top box, and so on. In addition, while FIG. 2 illustrates that three user terminals 210_1, 210_2, and 210_3 are in communication with the information processing system 230 through the network 220, aspects are not limited thereto, and a different number of user terminals may be configured to be in communication with the information processing system 230 through the network 220.

According to another example, the user terminals 210_1, 210_2, and 210_3 may process images such that input images are converted into high-resolution images. To this end, the user terminals 210_1, 210_2, and 210_3 may include the feature map extraction unit 120, the attention processing unit 140, and the image processing model 170 illustrated in FIG. 1. That is, the user terminals 210_1, 210_2, and 210_3 may upscale the image received from the information processing system 230 or input from the user into a high-resolution image using the feature map extraction unit 120, the attention processing unit 140, and the image processing model 170. For example, the information processing system 230 may be a server providing a streaming service, and the user terminals 210_1, 210_2, and 210_3 may receive video/image transmitted by the information processing system 230, and perform image processing on the received video/image using the feature map extraction unit 120, the attention processing unit 140, and the image processing model 170.

According to some examples, the user terminals 210_1, 210_2, and 210_3 and the information processing system 230 may perform image processing in association with each other. For example, the information processing system 230 may extract a feature map from the image and transmit the extracted feature map to the user terminals 210_1, 210_2, and 210_3, and the user terminals 210_1, 210_2, and 210_3 may sample each channel included in the feature map, calculate channel attention vectors based on the sampled channels, and generate a weighted feature map based on the calculated channel attention vectors. In addition, the user terminals 210_1, 210_2, and 210_3 may input the weighted feature map to the image processing model and acquire a processed image from the image processing model. As another example, the user terminals 210_1, 210_2, and 210_3 may extract a feature map from the images and transmit the extracted feature map to the information processing system 230, and the information processing system 230 may sample each channel included in the feature map, calculate channel attention vectors based on the sampled channels, and generate a weighted feature map based on the calculated channel attention vectors. In this case, the information processing system 230 may input the weighted feature map to the image processing model and acquire a processed image, and transmit the acquired processed image to the user terminals 210_1, 210_2, and 210_3. That is, some functions of the feature map extraction unit, the attention processing unit, and the image processing model may be performed by the user terminals 210_1, 210_2, and 210_3, and the other functions may be performed by the information processing system 230. Some of the functions illustrated in FIG. 1 may be arbitrarily allocated to the user terminals 210_1, 210_2, and 210_3 or the information processing system 230.

According to the present disclosure, lightweight image processing is possible, because the features sampled from each channel included in the feature map are extracted and the average pooling or maximum pooling is performed only on the sampled features. Accordingly, the image processing can be performed in the user terminals 210_1, 210_2, and 210_3 and smooth image processing is possible using the limited computing resources. In addition, in the case of an image, since adjacent pixels are highly likely to include similar values, the average pooling or maximum pooling can be performed only on the sampled features as described above, without significantly degrading the quality of the processed image. Accordingly, the user terminals 210_1, 210_2, and 210_3 can also process the image at a high speed, and the processing time is reduced without degrading the quality of the final result.

Figure 3:
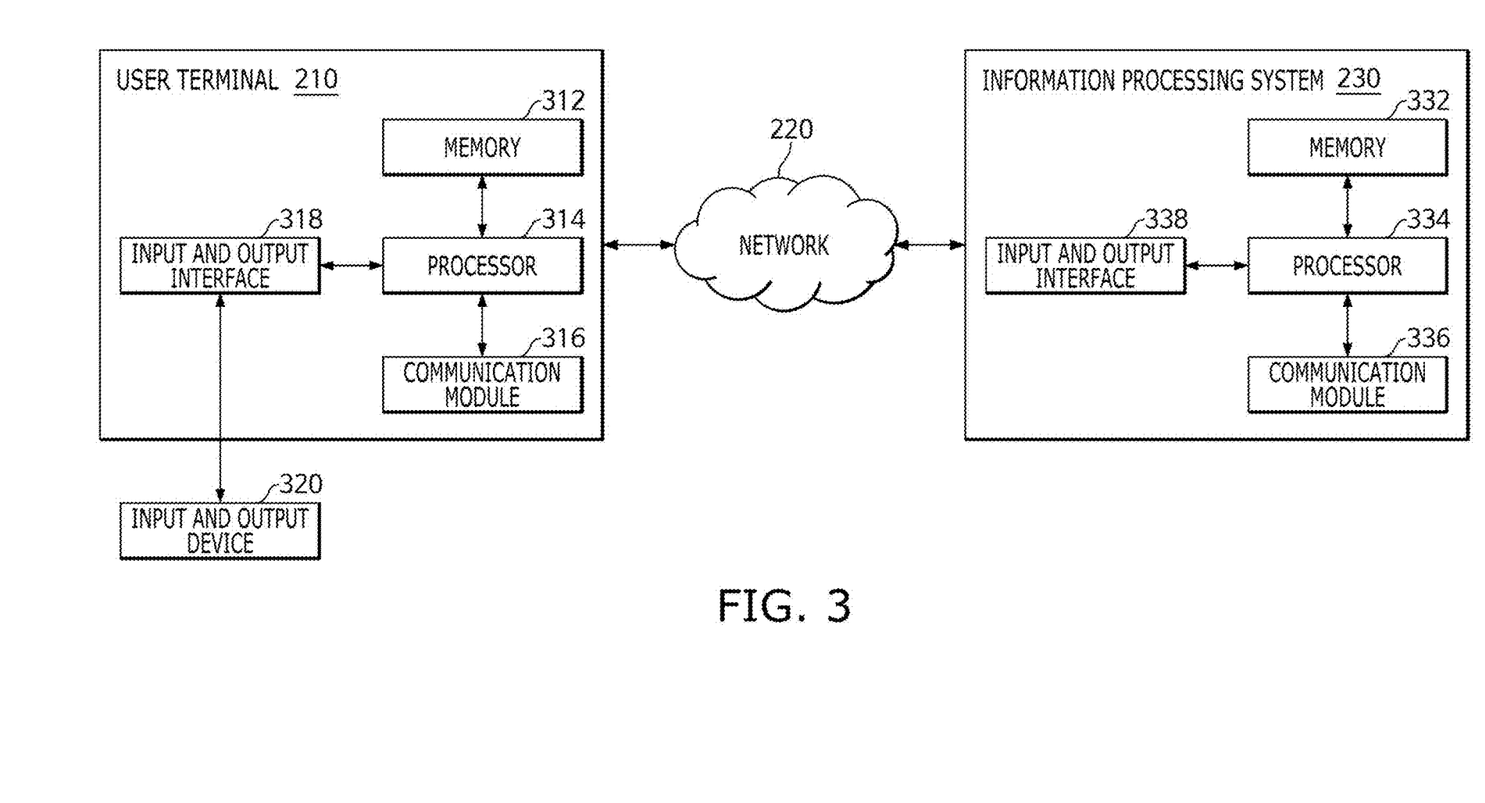
FIG. 3 is a block diagram of an internal configuration of the user terminal and the information processing system.

FIG. 3 is a block diagram of an internal configuration of the user terminal 210 and the information processing system 230. The user terminal 210 may refer to any computing device capable of wired and/or wireless communication, and may include the mobile phone terminal 210_1, the tablet terminal 210_2, and the PC terminal 210_3 of FIG. 2, and the like. As illustrated, the user terminal 210 may include a memory 312, a processor 314, a communication module 316, and an input and output interface 318. Likewise, the information processing system 230 may include a memory 332, a processor 334, a communication module 336, and an input and output interface 338. As illustrated in FIG. 3, the user terminal 210 and the information processing system 230 may be configured to communicate information and/or data through the network 220 using respective communication modules 316 and 336. In addition, an input and output device 320 may be configured to input information and/or data to the user terminal 210 or output information and/or data generated from the user terminal 210 through the input and output interface 318.

The memories 312 and 332 may include any non-transitory computer-readable recording medium. The memories 312 and 332 may include a permanent mass storage device such as read only memory (ROM), disk drive, solid state drive (SSD), flash memory, and so on. As another example, a non-destructive mass storage device such as ROM, SSD, flash memory, disk drive, and so on may be included in the user terminal 210 or the information processing system 230 as a separate permanent storage device that is distinct from the memory. In addition, an operating system and at least one program code (e.g., a code installed and driven in the user terminal 210 for image processing, and the like) may be stored in the memories 312 and 332.

These software components may be loaded from a computer-readable recording medium separate from the memories 312 and 332. Such a separate computer-readable recording medium may include a recording medium directly connectable to the user terminal 210 and the information processing system 230, and may include a computer-readable recording medium such as a floppy drive, a disk, a tape, a DVD/CD-ROM drive, a memory card, and so on, for example. As another example, the software components may be loaded into the memories 312 and 332 through the communication modules rather than the computer-readable recording medium. For example, at least one program may be loaded into the memories 312 and 332 based on a computer program installed by files provided by developers or a file distribution system that distributes an installation file of an application via the network 220.

The processors 314 and 334 may be configured to process the instructions of the computer program by performing basic arithmetic, logic, and input and output operations. The instructions may be provided to the processors 314 and 334 from the memories 312 and 332 or the communication modules 316 and 336. For example, the processors 314 and 334 may be configured to execute the received instructions according to a program code stored in a recording device such as the memories 312 and 332.

The communication modules 316 and 336 may provide a configuration or function for the user terminal 210 and the information processing system 230 to communicate with each other through the network 220, and may provide a configuration or function for the user terminal 210 and/or the information processing system 230 to communicate with another user terminal or another system (e.g., a separate cloud system or the like). For example, the requests or data generated by the processor 314 of the user terminal 210 according to the program code stored in the recording device such as the memory 312 or the like may be transmitted to the information processing system 230 through the network 220 under the control of the communication module 316. Conversely, a control signal or a command provided under the control of the processor 334 of the information processing system 230 may be received by the user terminal 210 through the communication module 316 of the user terminal 210 through the communication module 336 and the network 220.

The input and output interface 318 may be a means for interfacing with the input and output device 320. As an example, the input device may include a device such as a camera including an audio sensor and/or an image sensor, a keyboard, a microphone, a mouse, and so on, and the output device may include a device such as a display, a speaker, a haptic feedback device, and so on. As another example, the input and output interface 318 may be a means for interfacing with a device such as a touch screen or the like that integrates a configuration or function for performing inputting and outputting. For example, when the processor 314 of the user terminal 210 processes the instructions of the computer program loaded into the memory 312, a service screen or the like, which is configured with the information and/or data provided by the information processing system 230 or another user terminals, may be displayed on the display via the input and output interface 318. While FIG. 3 illustrates that the input and output device 320 is not included in the user terminal 210, aspects are not limited thereto, and an input and output device may be configured as one device with the user terminal 210. In addition, the input and output interface 338 of the information processing system 230 may be a means for interfacing with a device (not illustrated) for inputting or outputting that may be connected to, or included in the information processing system 230. While FIG. 3 illustrates the input and output interfaces 318 and 338 as the components configured separately from the processors 314 and 334, aspects are not limited thereto, and the input and output interfaces 318 and 338 may be configured to be included in the processors 314 and 334.

The user terminal 210 and the information processing system 230 may include more than those components illustrated in FIG. 3. Meanwhile, most of the related components may not necessarily require exact illustration. The user terminal 210 may be implemented to include at least a part of the input and output device 320 described above. In addition, the user terminal 210 may further include other components such as a transceiver, a Global Positioning System (GPS) module, a camera, various sensors, a database, and the like. For example, if the user terminal 210 is a smartphone, it may include components generally included in the smartphone. For example, it may be implemented such that various components such as an acceleration sensor, a gyro sensor, an image sensor, a proximity sensor, a touch sensor, an illuminance sensor, a camera module, various physical buttons, buttons using a touch panel, input and output ports, a vibrator for vibration, and so on may be further included in the user terminal 210.

While a program for an image processing or the like is being operated, the processor 314 may be configured to receive text, image, video, audio, and/or action, and so on inputted or selected through the input device such as a camera, a microphone, and so on, that includes a touch screen, a keyboard, an audio sensor and/or an image sensor connected to the input and output interface 318, and store the received text, image, video, audio, and/or action, and so on in the memory 312, or provide the same to the information processing system 230 through the communication module 316 and the network 220.

The processor 314 of the user terminal 210 may be configured to manage, process, and/or store the information and/or data received from the input and output device 320, another user terminal, the information processing system 230 and/or a plurality of external systems. The information and/or data processed by the processor 314 may be provided to the information processing system 230 via the communication module 316 and the network 220. The processor 314 of the user terminal 210 may be configured to transmit the information and/or data to the input and output device 320 via the input and output interface 318 to output the same. For example, the processor 314 may display the received information and/or data on a screen of the user terminal 210.

The processor 334 of the information processing system 230 may be configured to manage, process, and/or store information and/or data received from a plurality of user terminals 210 and/or a plurality of external systems. The information and/or data processed by the processor 334 may be provided to the user terminals 210 via the communication module 336 and the network 220.

Hereinafter, various methods for sampling each channel included in the feature map will be described with reference to FIGS. 4 to 7.

Figure 4:
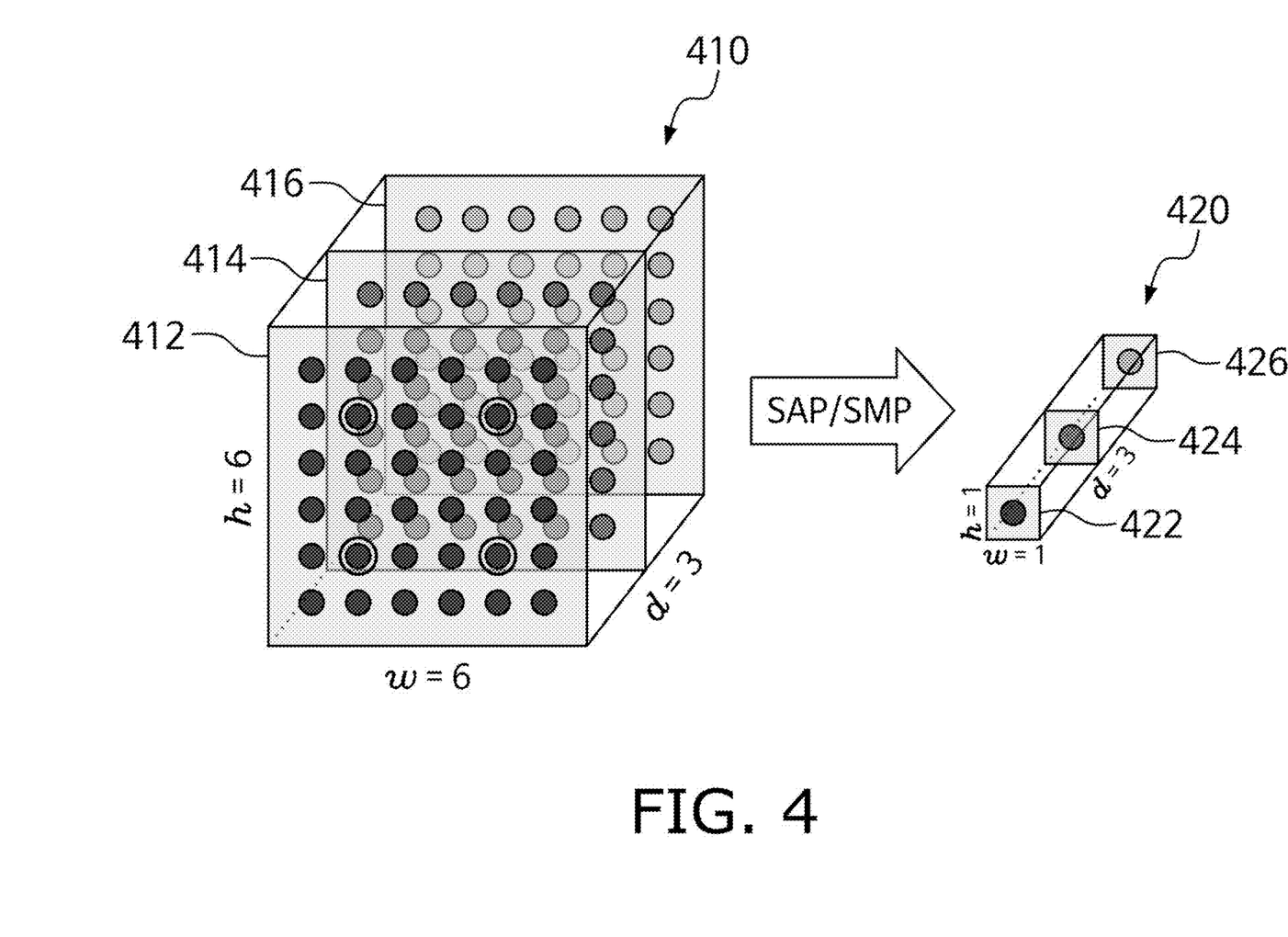
FIG. 4 is a diagram illustrating a result of pooling the features sampled from a feature map.

FIG. 4 is a diagram illustrating a result of pooling the features sampled from a feature map 410. FIG. 4 illustrates that the feature map 410 has a total of three channels 412, 414, and 416. In this example, the three channels 412, 414, and 416 may be a Red channel, a Green channel, and a Blue channel. FIG. 4 illustrates three channels in the feature map 410 as an example, and the feature map 410 may include any number of channels.

The feature map 410 may have width, height, and depth. In this example, the width of the feature map 410 is the width size of each channel 412, 414, and 416, and is illustrated as "w=6" in FIG. 4. In addition, the height of the feature map 410 is the height size of the channels 412, 414, and 416, and is illustrated as "h=6" in FIG. 4. In addition, the depth of the feature map 410 is the number of channels, and is illustrated as "d=3" in FIG. 4. FIG. 4 illustrates that the feature map 410 is illustrated as w=6, h=6, and d=3, but aspects are not limited thereto, and the feature map 410 may have any width, height, and depth values.

As illustrated in FIG. 4, instead of performing pooling (average pooling or max pooling) on all features (that is, on 36 features) included in each channel 412, 414, and 416, some features included in each of the channels 412, 414, and 416 may be extracted/sampled, and pooling may be performed on the sampled features. FIG. 4 illustrates an example in which 4 features are sampled from all features (that is, from 36 features) included in each channel, and pooling (average pooling or max pooling) is performed based on the sampled features.

As described above, a SAP/SMP map 420 including a result of pooling each channel may be acquired. The SAP/SMP map 420 may include result values 422, 424, and 426 of pooling each channel. That is, the SAP/SMP map 420 may include a pooling value 422 of the first channel, a pooling value 424 of the second channel, and a pooling value 426 of the third channel.

The sampling performed for each of the plurality of channels of the feature map 410 may be regular sampling or irregular sampling based on a predetermined interval. The irregular sampling may be performed based on at least one of image type, Gaussian distribution, or available computing resources.

Figure 5:
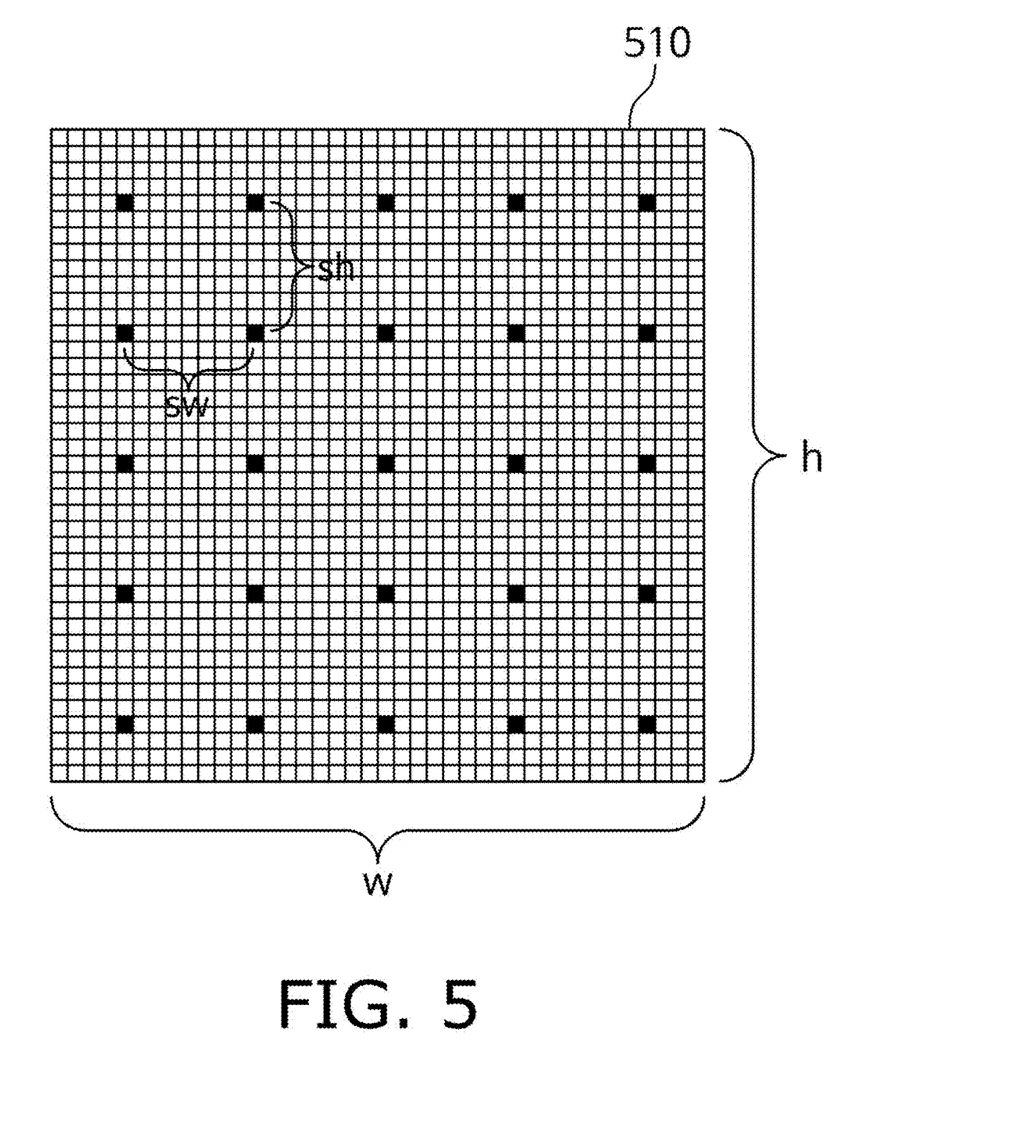
FIG. 5 is a diagram illustrating a first sampling pattern used in a regular sampling method.

FIG. 5 is a diagram illustrating a first sampling pattern 510 used in a regular sampling method. The first sampling pattern 510 in FIG. 5 may be used for the regular sampling method. In this example, the regular sampling method may be a sampling method applied by default.

As illustrated in FIG. 5, the first sampling pattern 510 has a height (h) and a width (w), and may include a plurality of sampling positions regularly distributed at equal intervals (sw, sh). The equal interval (sw) in the width direction and the equal interval (sh) in the height direction may be the same as or different from each other. In FIG. 5, the sampling positions are indicated as black boxes, and the black box may be associated with a position within one channel. Based on the sampling positions included in the first sampling pattern 510, some features may be sampled from the entire region of each channel at regular intervals.

Meanwhile, the sampling interval of the sampling pattern according to the regular sampling method may be adaptively determined based on the available computing resources. Information associated with the available computing resources may be acquired periodically, or before sampling is performed on each channel of the feature map. In this case, the computing resource may include at least one of a memory resource, a processor resource, a disk resource, or a network resource. If the information processing system performs sampling, the information associated with available computing resources of the information processing system may be acquired. As another example, if the user terminal performs sampling, information associated with the available computing resources of the user terminal may be acquired.

A sampling level may be determined based on the acquired amount of available computing resources, and the sampling interval of the sampling pattern may be determined based on the sampling level. For example, if the available computing resources exceed a first threshold, the sampling level is determined to be a first level, if the available computing resources are equal to or less than the first threshold and exceed a second threshold, the sampling level may be determined to be a second level, and if the available computing resources are equal to or less than the second threshold, the sampling level may be determined to be a third level. In this case, if the sampling level is the first level, the sampling interval may be determined to be a first sampling interval, if the sampling level is the second level, the sampling interval may be determined to be a second sampling interval, and if the sampling level is the third level, each sampling interval may be determined to be a third sampling interval, respectively. Of the first sampling interval, the second sampling interval, and the third sampling interval, the first sampling interval may be the narrowest and the third sampling interval may be the widest.

Figure 6:
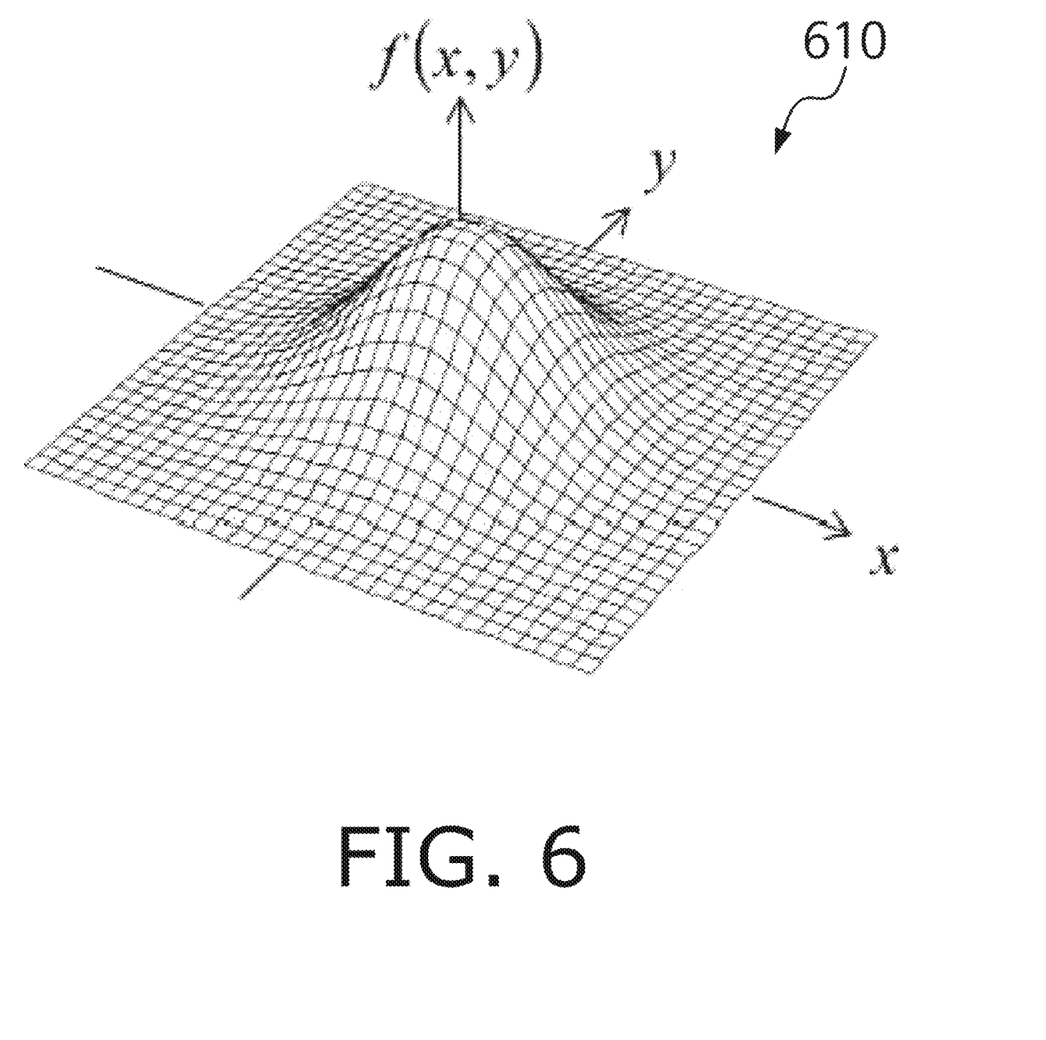
FIG. 6 is a diagram illustrating an example of performing irregular sampling based on Gaussian distribution.

FIG. 6 is a diagram illustrating an example of performing irregular sampling based on a Gaussian distribution 610. As illustrated in FIG. 6, the Gaussian distribution 610 may have the highest value at the center and a decreasing value toward the periphery. The sampling may be differently performed for each region using such Gaussian distribution 610. For example, the sampling may be performed at the closest interval in the center of each channel, and the sampling may be performed at wider intervals toward the periphery of each channel according to the Gaussian distribution 610. That is, more features may be extracted from the center of each channel than from the periphery, and pooling (average pooling or max pooling) may be performed.

In another example, based on the Gaussian distribution, a first region including a central region may be determined, and a second region including an outer region may be determined. For example, a region having an expected value equal to or greater than a predetermined value may be determined to be the first region, and a region having an expected value less than the predetermined value may be determined to be the second region. In this case, the first sampling interval in the first region and the second sampling interval in the second region may be determined to be different from each other. For example, the first sampling interval may be narrower than the second sampling interval. That is, the first region including the central region may be sampled at closer intervals than the second region including the outer region.

Meanwhile, in the case of an irregular sampling method, the sampling interval may also be adaptively determined based on the available computing resources. The available computing resources may be acquired periodically or before sampling is performed on each channel of the feature map. The sampling level may be determined based on the acquired amount of available computing resources, and the sampling interval may be determined based on the sampling level. For example, if the sampling interval of the first region is the first sampling interval and the sampling interval of the second region is the second sampling interval that are determined based on the Gaussian distribution 610, the first sampling interval and the second sampling interval may be determined based on the sampling level.

Figure 7:
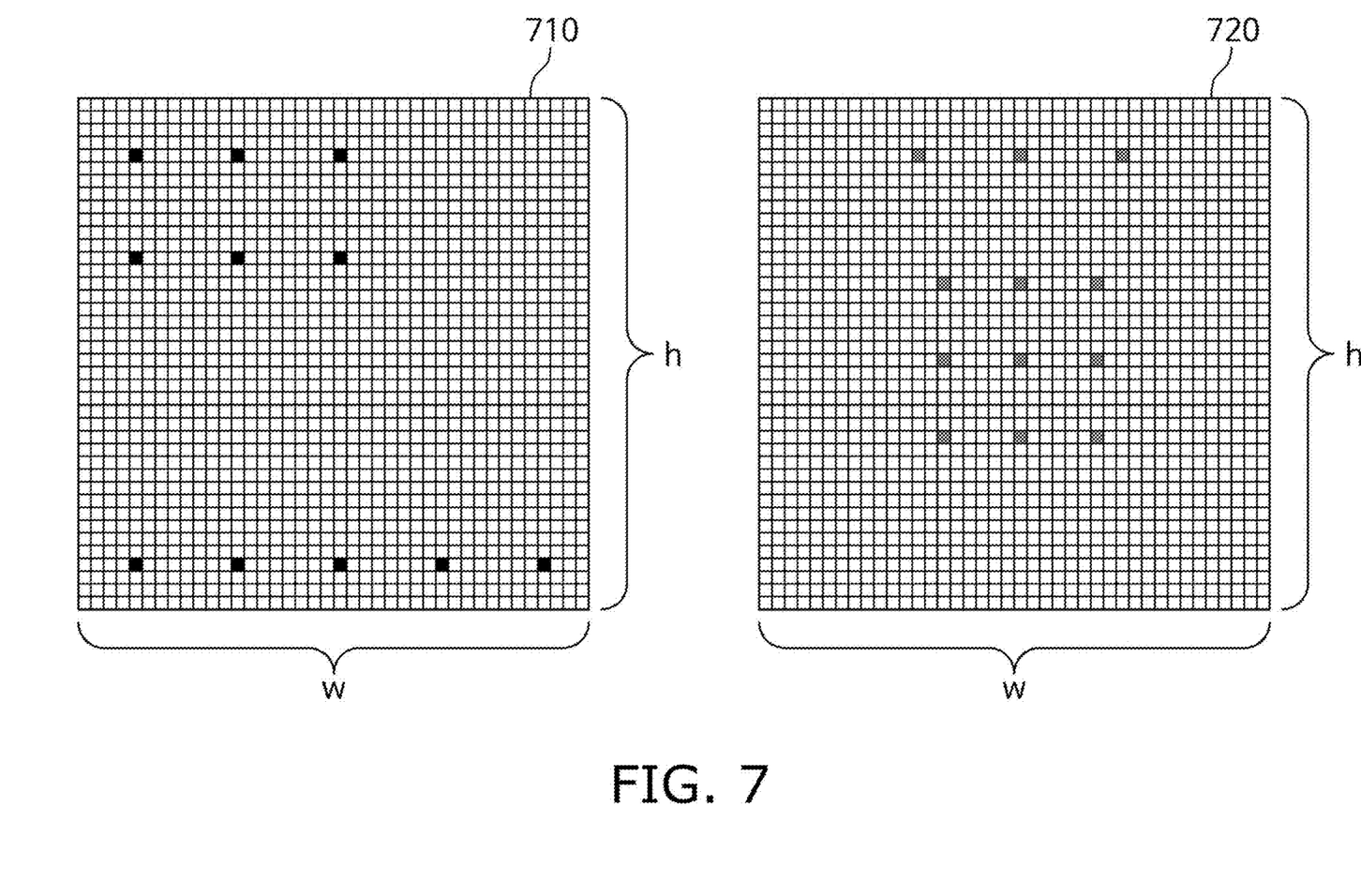
FIG. 7 is a diagram illustrating second and third sampling patterns used in an irregular sampling method.

FIG. 7 is a diagram illustrating a second sampling pattern 710 and a third sampling pattern 720. The second sampling pattern 710 and the third sampling pattern 720 in FIG. 7 are examples of the irregular sampling method. In this case, the sampling pattern according to the irregular sampling method may be applied based on the image type. For example, the second sampling pattern 710 may be applied to the first type of image, and the third sampling pattern 720 may be applied to the second type of image. The image type of the input image may be determined using a pretrained artificial neural network model. Alternatively, identification information for the image type may be included in the image, or the user may input the image type.

As illustrated in FIG. 7, the second sampling pattern 710 and the third sampling pattern 720 may have a constant height (h) and width (w), and may include a plurality of sampling positions. In the second sampling pattern 710, the sampling positions are concentrated in the lower region and the upper left region. In the third sampling pattern 720, the sampling positions are concentrated in the center region and the upper region. The sampling positions to be concentrated may be determined according to each image type, and an irregular sampling list including the plurality of irregular sampling patterns 710 and 720 including the determined sampling positions and image types may be stored in the information processing system and/or the user terminal.

If an image corresponding to the image type included in the irregular sampling list is input, the information processing system and/or the user terminal may acquire an irregular sampling pattern corresponding to the corresponding image type, and perform the sampling on the feature map based on the sampling positions included in the acquired irregular sampling pattern.

Meanwhile, if an image that does not correspond to the irregular sampling list is input, the information processing system and/or the user terminal may perform the regular sampling or irregular sampling according to the Gaussian distribution.

Figure 8:
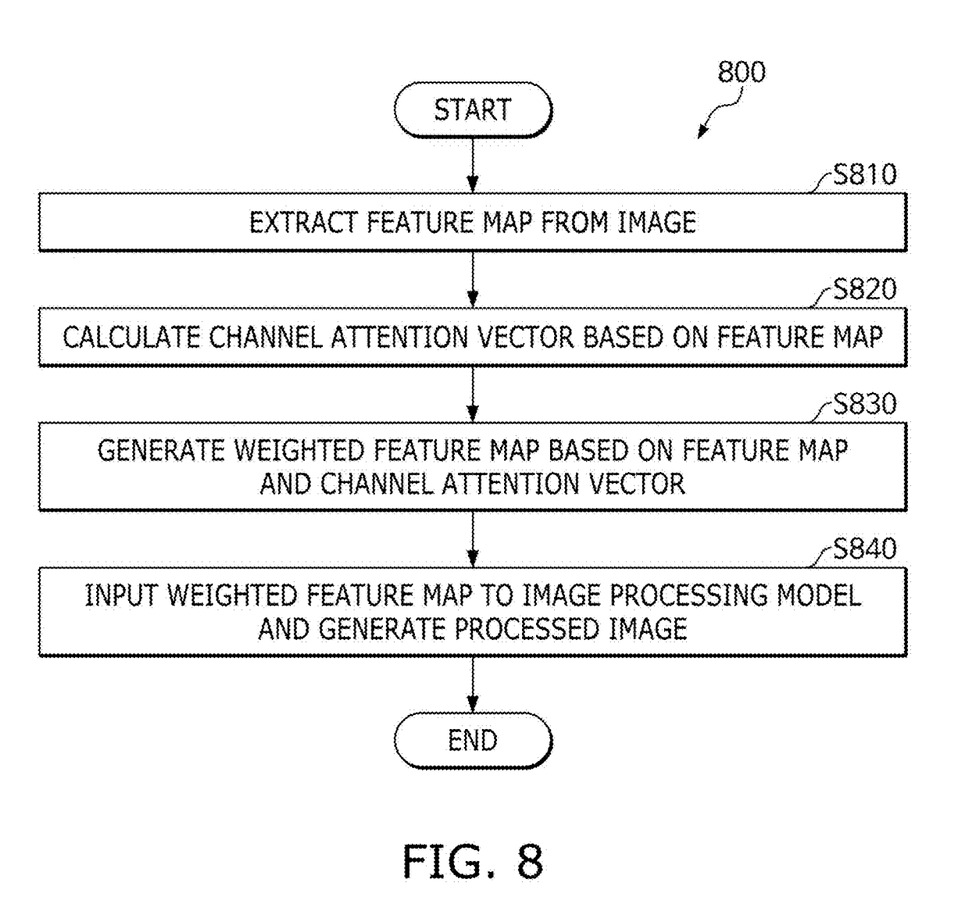
FIG. 8 is a flowchart illustrating a lightweight image processing method.

FIG. 8 is a flowchart illustrating a lightweight image processing method 800. The method illustrated in FIG. 8 is merely one example for achieving the object of the present disclosure, and it goes without saying that some steps may be added or deleted as needed. In addition, the method illustrated in FIG. 8 may be performed by at least one processor included in the information processing system and/or the user terminal illustrated in FIG. 3. For convenience of explanation, it will be described that each step illustrated in FIG. 3 is performed by the processor included in the user terminal illustrated in FIG. 3.

The processor may extract a feature map from an image, at S810.

The processor may calculate a channel attention vector based on the feature map, at S820. The feature map may have a plurality of channels, and the processor may perform sampling on each of the plurality of channels of the feature map to acquire a plurality of sampled channels, and calculate a channel attention vector based on the plurality of sampled channels of the feature map. The sampling performed for each of the plurality of channels of the feature map may be the regular sampling based on a predetermined interval, or the irregular sampling.

If the irregular sampling is used, the processor may perform the sampling on each of the plurality of channels of the feature map according to the Gaussian distribution. As another example, if the irregular sampling is used, the processor may acquire the sampling pattern and perform the sampling on each of the plurality of channels of the feature map using the acquired sampling pattern. In this case, the processor may identify the type of image and acquire a sampling pattern associated with the identified type of image, from a plurality of pre-stored sampling patterns.

The processor may determine the sampling level based on the acquired amount of available computing resources, and perform the sampling on each of the plurality of channels of the feature map based on the determined sampling level.

The processor may perform the average pooling or the maximum pooling on each of a plurality of sampled channels of the feature map, and calculate a channel attention vector based on a result acquired from the average pooling or maximum pooling.

The processor may generate a weighted feature map based on the feature map and the channel attention vector, at S830.

The processor may input the weighted feature map to the image processing model and generate a processed image, at S840. In this case, the image processing model may be an artificial neural network model.

The flowchart and description described above are merely examples, and may be implemented differently in some examples. For example, in some examples, the order of respective steps may be changed, some steps may be repeatedly performed, some steps may be omitted, or some steps may be added.

The method described above may be provided as a computer program stored in a computer-readable recording medium for execution on a computer. The medium may be a type of medium that continuously stores a program executable by a computer, or temporarily stores the program for execution or download. In addition, the medium may be a variety of recording means or storage means having a single piece of hardware or a combination of several pieces of hardware, and is not limited to a medium that is directly connected to any computer system, and accordingly, may be present on a network in a distributed manner. An example of the medium includes a medium configured to store program instructions, including a magnetic medium such as a hard disk, a floppy disk, and a magnetic tape, an optical medium such as a CD-ROM and a DVD, a magnetic-optical medium such as a floptical disk, and a ROM, a RAM, a flash memory, and so on. In addition, other examples of the medium may include an app store that distributes applications, a site that supplies or distributes various software, and a recording medium or a storage medium managed by a server.

The methods, operations, or techniques of the present disclosure may be implemented by various means. For example, these techniques may be implemented in hardware, firmware, software, or a combination thereof. Those skilled in the art will further appreciate that various illustrative logical blocks, modules, circuits, and algorithm steps described in connection with the disclosure herein may be implemented in electronic hardware, computer software, or combinations of both. To clearly illustrate this interchangeability of hardware and software, various illustrative components, blocks, modules, circuits, and steps have been described above generally in terms of their functionality. Whether such a function is implemented as hardware or software varies depending on design requirements imposed on the particular application and the overall system. Those skilled in the art may implement the described functions in varying ways for each particular application, but such implementation should not be interpreted as causing a departure from the scope of the present disclosure.

In a hardware implementation, processing units used to perform the techniques may be implemented in one or more ASICs, DSPs, digital signal processing devices (DSPDs), programmable logic devices (PLDs), field programmable gate arrays (FPGAs), processors, controllers, microcontrollers, microprocessors, electronic devices, other electronic units designed to perform the functions described in the present disclosure, computer, or a combination thereof.

Accordingly, various example logic blocks, modules, and circuits described in connection with the present disclosure may be implemented or performed with general purpose processors, DSPs, ASICs, FPGAs or other programmable logic devices, discrete gate or transistor logic, discrete hardware components, or any combination of those designed to perform the functions described herein. The general purpose processor may be a microprocessor, but in the alternative, the processor may be any related processor, controller, microcontroller, or state machine. The processor may also be implemented as a combination of computing devices, for example, a DSP and microprocessor, a plurality of microprocessors, one or more microprocessors associated with a DSP core, or any other combination of the configurations.

In the implementation using firmware and/or software, the techniques may be implemented with instructions stored on a computer-readable medium, such as random access memory (RAM), read-only memory (ROM), non-volatile random access memory (NVRAM), programmable read-only memory (PROM), erasable programmable read-only memory (EPROM), electrically erasable PROM (EEPROM), flash memory, compact disc (CD), magnetic or optical data storage devices, and the like. The instructions may be executable by one or more processors, and may cause the processor(s) to perform certain aspects of the functions described in the present disclosure.

When implemented in software, the techniques described above may be stored on a computer-readable medium as one or more instructions or codes, or may be sent via a computer-readable medium. The computer-readable media include both the computer storage media and the communication media including any medium that facilitates the transmission of a computer program from one place to another. The storage media may also be any available media that may be accessed by a computer. By way of non-limiting example, such a computer-readable medium may include RAM, ROM, EEPROM, CD-ROM or other optical disk storage, magnetic disk storage or other magnetic storage devices, or any other media that can be used to transmit or store desired program code in the form of instructions or data structures and can be accessed by a computer. In addition, any connection is properly referred to as a computer-readable medium.

For example, if the software is sent from a website, server, or other remote sources using coaxial cable, fiber optic cable, twisted pair, digital subscriber line (DSL), or wireless technologies such as infrared, wireless, and microwave, the coaxial cable, the fiber optic cable, the twisted pair, the digital subscriber line, or the wireless technologies such as infrared, wireless, and microwave are included within the definition of the medium. The disks and the discs used herein include CDs, laser disks, optical disks, digital versatile discs (DVDs), floppy disks, and Blu-ray disks, where disks usually magnetically reproduce data, while discs optically reproduce data using a laser. The combinations described above should also be included within the scope of the computer-readable media.

The software module may reside in RAM memory, flash memory, ROM memory, EPROM memory, EEPROM memory, registers, hard disk, removable disk, CD-ROM, or any other form of storage medium known. An exemplary storage medium may be connected to the processor such that the processor may read or write information from or to the storage medium. Alternatively, the storage medium may be integrated into the processor. The processor and the storage medium may exist in the ASIC. The ASIC may exist in the user terminal. Alternatively, the processor and storage medium may exist as separate components in the user terminal.

Although the examples described above have been described as utilizing aspects of the currently disclosed subject matter in one or more standalone computer systems, aspects are not limited thereto, and may be implemented in conjunction with any computing environment, such as a network or distributed computing environment. Furthermore, the aspects of the subject matter in the present disclosure may be implemented in multiple processing chips or devices, and storage may be similarly influenced across a plurality of devices. Such devices may include PCs, network servers, and portable devices.

Although the present disclosure has been described in connection with some examples herein, various modifications and changes can be made without departing from the scope of the present disclosure, which can be understood by those skilled in the art to which the present disclosure pertains. In addition, such modifications and changes should be considered within the scope of the claims appended herein.

The invention claimed is:

1. A method comprising:
extracting, by a computing device, a feature map from an image, wherein the feature map has a plurality of channels;
identifying a type of the image;
acquiring from a plurality of pre-stored sampling patterns a sampling pattern associated with the type of the image;
acquiring a plurality of sampled channels of the feature map by performing, using the acquired sampling pattern, sampling on each of the plurality of channels of the feature map;
calculating, based on the plurality of sampled channels of the feature map, a channel attention vector;
generating, based on the feature map and the channel attention vector, a weighted feature map;
inputting the weighted feature map to an image processing model to generate a processed image, wherein the image processing model is an artificial neural network model; and
generating the processed image.

2. The method according to claim 1, wherein the sampling performed on each of the plurality of channels of the feature map is a regular sampling based on a predetermined interval.

3. The method according to claim 1, wherein the sampling performed on each of the plurality of channels of the feature map is an irregular sampling.

4. The method according to claim 1, wherein the sampling performed on each of the plurality of channels of the feature map is performed according to a Gaussian distribution.

5. The method according to claim 1, wherein the calculating the channel attention vector further comprises performing an average pooling or a maximum pooling on each of the plurality of sampled channels of the feature map.

6. The method according to claim 1, wherein the acquiring the plurality of sampled channels comprises:
acquiring an amount of available computing resources;
determining, based on the acquired amount of available computing resources, a sampling level; and
performing, based on the determined sampling level, sampling on each of the plurality of channels of the feature map.

7. The method according to claim 1, wherein the plurality of pre-stored sampling patterns comprises a plurality of irregular sampling patterns.

8. An apparatus comprising:
one or more processors; and
a memory storing instructions that, when executed by the one or more processors, cause the apparatus to:
extract a feature map from an image, wherein the feature map has a plurality of channels;
identify a type of the image;
acquire, from a plurality of pre-stored sampling patterns, a sampling pattern associated with the type of the image;
acquire a plurality of sampled channels of the feature map by performing, using the acquired sampling pattern, sampling on each of the plurality of channels of the feature map;
calculate, based on the plurality of sampled channels of the feature map, a channel attention vector;
generate, based on the feature map and the channel attention vector, a weighted feature map;
input the weighted feature map to an image processing model to generate a processed image, wherein the image processing model is an artificial neural network model; and
generate the processed image.

9. The apparatus of claim 8, wherein the sampling performed on each of the plurality of channels of the feature map is a regular sampling based on a predetermined interval.

10. The apparatus of claim 8, wherein the sampling performed on each of the plurality of channels of the feature map is an irregular sampling.

11. The apparatus of claim 8, wherein the sampling performed on each of the plurality of channels of the feature map is performed according to a Gaussian distribution.

12. The apparatus of claim 8, wherein the instructions, when executed by the one or more processors, cause the apparatus to calculate the channel attention vector further by causing the apparatus to perform an average pooling or a maximum pooling on each of the plurality of sampled channels of the feature map.

13. The apparatus of claim 8, wherein the instructions, when executed by the one or more processors, cause the apparatus to acquire the plurality of sampled channels by causing the apparatus to:
acquire an amount of available computing resources;
determine, based on the acquired amount of available computing resources, a sampling level; and
perform, based on the determined sampling level, sampling on each of the plurality of channels of the feature map.

14. The apparatus of claim 8, wherein the plurality of pre-stored sampling patterns comprises a plurality of irregular sampling patterns.

15. One or more non-transitory computer-readable media storing instructions that, when executed by one or more processors of a computing device, cause the computing device to:
extract a feature map from an image, wherein the feature map has a plurality of channels;
identify a type of the image;
acquire, from a plurality of pre-stored sampling patterns, a sampling pattern associated with the type of the image;
acquire a plurality of sampled channels of the feature map by performing, using the acquired sampling pattern, sampling on each of the plurality of channels of the feature map;
calculate, based on the plurality of sampled channels of the feature map, a channel attention vector;
generate, based on the feature map and the channel attention vector, a weighted feature map;
input the weighted feature map to an image processing model to generate a processed image, wherein the image processing model is an artificial neural network model; and
generate the processed image.

16. The one or more non-transitory computer-readable media of claim 15, wherein the sampling performed on each of the plurality of channels of the feature map is a regular sampling based on a predetermined interval.

17. The one or more non-transitory computer-readable media of claim 15, wherein the sampling performed on each of the plurality of channels of the feature map is an irregular sampling.

18. The one or more non-transitory computer-readable media of claim 15, wherein the sampling performed on each of the plurality of channels of the feature map is performed according to a Gaussian distribution.

19. The one or more non-transitory computer-readable media of claim 15, wherein the instructions, when executed by the one or more processors, cause the computing device to calculate the channel attention vector further by causing the computing device to perform an average pooling or a maximum pooling on each of the plurality of sampled channels of the feature map.

20. The one or more non-transitory computer-readable media of claim 15, wherein the instructions, when executed by the one or more processors, cause the computing device to acquire the plurality of sampled channels by causing the computing device to:
- acquire an amount of available computing resources;
- determine, based on the acquired amount of available computing resources, a sampling level; and
- perform, based on the determined sampling level, sampling on each of the plurality of channels of the feature map.

\* \* \* \* \*